United States Patent
Figueira et al.

(10) Patent No.: US 8,018,880 B2
(45) Date of Patent: Sep. 13, 2011

(54) LAYER 2 VIRTUAL PRIVATE NETWORK OVER PBB-TE/PBT AND SEAMLESS INTERWORKING WITH VPLS

(75) Inventors: Norival R. Figueira, Campbell, CA (US); Richard D. Gitlin, Little Silver, NJ (US)

(73) Assignee: Brixham Solutions Ltd., Tortola (VG)

( * ) Notice: Subject to any disclaimer, the term of this patent is extended or adjusted under 35 U.S.C. 154(b) by 141 days.

(21) Appl. No.: 12/079,413

(22) Filed: Mar. 25, 2008

(65) Prior Publication Data

US 2008/0247406 A1 Oct. 9, 2008

Related U.S. Application Data

(60) Provisional application No. 60/920,227, filed on Mar. 26, 2007.

(51) Int. Cl.
*H04B 3/30* (2006.01)
(52) U.S. Cl. ............... 370/285; 370/395.3; 370/395.5; 370/395.53; 709/231; 709/249
(58) Field of Classification Search ............ 370/285, 370/395.3, 395.5, 395.53, 401; 709/231, 709/249; 710/10, 30
See application file for complete search history.

(56) References Cited

U.S. PATENT DOCUMENTS

| | | | | |
|---|---|---|---|---|
| 7,688,756 B2 * | 3/2010 | Allan et al. | | 370/254 |
| 7,787,478 B2 * | 8/2010 | Khouderchah et al. | | 370/401 |
| 2004/0037279 A1 * | 2/2004 | Zelig et al. | | 370/390 |
| 2004/0042454 A1 | 3/2004 | Zabihi et al. | | |
| 2004/0081171 A1 * | 4/2004 | Finn | | 370/395.53 |
| 2004/0170173 A1 | 9/2004 | Pan et al. | | |
| 2005/0013297 A1 | 1/2005 | Eriksson | | |
| 2005/0044262 A1 * | 2/2005 | Luo | | 709/238 |
| 2005/0169270 A1 | 8/2005 | Mutou et al. | | |
| 2006/0029032 A1 * | 2/2006 | Allan et al. | | 370/351 |
| 2006/0047851 A1 | 3/2006 | Voit et al. | | |
| 2006/0187950 A1 * | 8/2006 | Bou-Diab et al. | | 370/432 |
| 2006/0245436 A1 | 11/2006 | Sajassi | | |
| 2007/0008982 A1 * | 1/2007 | Voit et al. | | 370/401 |
| 2007/0086361 A1 | 4/2007 | Allan | | |
| 2008/0101390 A1 * | 5/2008 | Hu | | 370/401 |
| 2008/0172497 A1 * | 7/2008 | Mohan et al. | | 709/249 |
| 2008/0212595 A1 | 9/2008 | Figueira | | |
| 2008/0219268 A1 * | 9/2008 | Dennison | | 370/395.2 |
| 2008/0247406 A1 * | 10/2008 | Figueira et al. | | 370/401 |
| 2008/0279196 A1 * | 11/2008 | Friskney et al. | | 370/395.53 |

OTHER PUBLICATIONS

U.S. Appl. No. 60/042,259, filed Mar. 1, 2007 to Dennison, L.*
Imtech, Welcome to Imtech Telecom-Future Networks, Oct. 9, 2007.
Adrian Belcher, World Wide Packets, The Merits of Metro/Carrier Ethernet Transport Technologies, Mar. 8, 2007.
Bottorff et al., Business Made Simple, Nortel, Provider Backbone Transport, Jul. 2006.
Sajassi, et al., VPLS interoperability with Provider Backbone Bridges, Mar. 2007.
Allan, D. et al., Provider Link-State Bridging, IEEE Communications Magazine, Sep. 2008.

* cited by examiner

*Primary Examiner* — Aung S Moe
*Assistant Examiner* — Benjamin Elliott (57) ABSTRACT

A Layer 2 Virtual Private Network (L2VPN) system is provided. A Provider Backbone Bridge (PBB) network is provided which comprises a plurality of sites to be connected via a L2VPN. The plurality of sites in the PBB network is connected using a plurality of provider backbone trunks that includes a Provider Backbone Transport (PBT) trunk or a Provider Backbone Bridge Traffic Engineering (PBB-TE) trunk, such that the L2VPN includes the plurality of sites.

51 Claims, 6 Drawing Sheets

LAYER 2 VIRTUAL PRIVATE NETWORK OVER PBB-TE/PBT AND SEAMLESS INTERWORKING WITH VPLS

CROSS REFERENCE TO OTHER APPLICATIONS

This application claims priority to U.S. Provisional Patent Application No. 60/920,227 entitled L2VPN OVER PBB/PBT AND SEAMLESS INTERWORKING WITH VPLS filed Mar. 26, 2007 which is incorporated herein by reference for all purposes.

BACKGROUND OF THE INVENTION

Creating a Layer 2 Virtual Private Network (L2VPN) over an Ethernet network is a problem service providers have had for some time. There are a number of solutions that exist or are in the process of being developed, but a number of issues are associated with these solutions. One issue is a slow recovery or convergence time in the event of failure, such as a physical link failure. For example, many solutions create L2VPNs by assigning customers to separate VLANs or service instances as defined in the IEEE 802.1Q, IEEE 802.1ad, or IEEE 802.1ah standards. These solutions rely on a Spanning Tree Protocol (STP) to restore traffic for bridged networks when physical links fail. However, it may take seconds to restore traffic after a link fails when STP is used in common service provider networks. This is not acceptable for service provides that need to provide Carrier Ethernet services with traffic restoration requirements on the order of tens of milliseconds. A typical desired network restoration time is less than 50 ms, which cannot be realistically achieved using STP. Another issue faced by service providers is lack of control over and/or knowledge of the paths or routes between nodes in a L2VPN. For example, one solution called Virtual Private LAN Services (VPLS) operates over Multi Protocol Label Switching (MPLS). The MPLS protocol sets up all routes, but as a result, the service provider does not have complete control over provisioned routes or how new routes will be dynamically chosen after link or node failures. Many service providers come from a telecommunications background where they had full control over and knowledge of routes, as well as backup routes, and may prefer having this knowledge and control. It would be desirable to develop new techniques for creating a L2VPN over an Ethernet network that address these issues.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
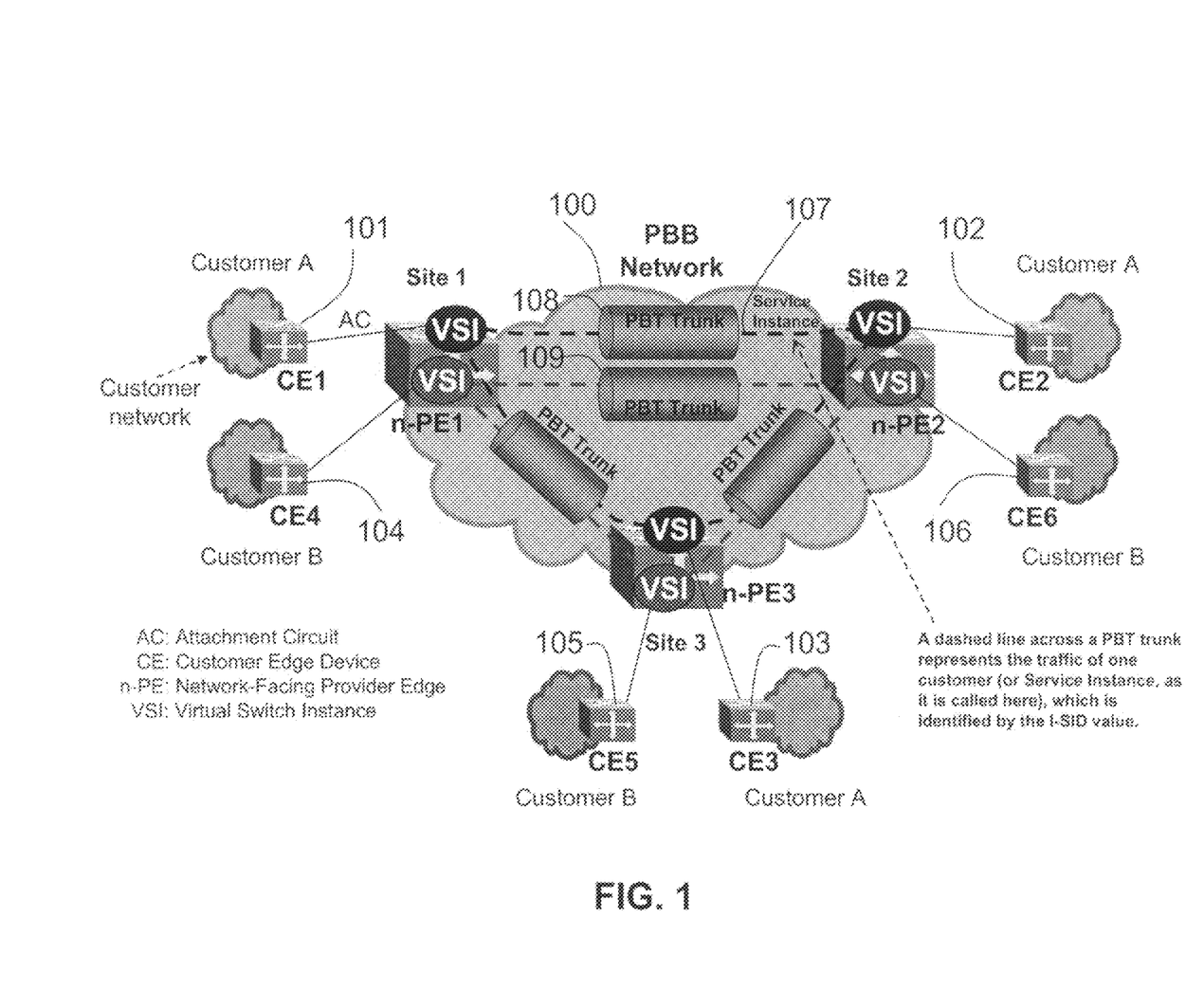
FIG. 1 is a diagram illustrating an embodiment of two L2VPNs where each L2VPN created spans three sites.

FIG. 1 is a diagram illustrating an embodiment of two L2VPNs where each L2VPN created spans three sites. In general, the figure shows two customers (i.e., A and B) over three sites. An L2VPN service is created for each customer using PBT trunks and VSIs. VSIs are interconnected by a full mesh of PBT trunks in this example. A PBT trunk between two sites can (if so desired) carry traffic for multiple customers. How many customers share a same PBT trunk is determined by the carrier based on (for example) account network resources, equipment capabilities, service requirements, business models, etc. This is discussed in further detail below. In the example shown, two L2VPNs are created in a Provider Backbone Bridge (PBB) network 100 over Provider Backbone Transport (PBT) trunks. PBB is defined in IEEE standard 802.1ah. PBT is also referred to as Provider Backbone Bridge Traffic Engineering (PBB-TE) in standards bodies (i.e., IEEE 802.1Qay), which stands for Provider Backbone Bridge Traffic Engineering. In this particular configuration, customer A has locations CE1-CE3 (101-103) and the other customer, customer B, has locations CE4-CE6 (104-106). As used herein, the term "location" is used for customers and the term "sites" is used for a service provider network. In some embodiments, a customer has two locations connected to the same service provider site, as will be exemplified in further detail below. In this embodiment, each service provider site supporting a given L2VPN for a customer has a dedicated Virtual Switch Instance (VSI) for that service, and all the VSIs for a given L2VPN are interconnected by a full mesh of PBT trunks. In some embodiments, this is not necessarily the case.

For clarity, FIG. 1 shows customers attached directly to n-PEs (i.e., network-facing Provider Edges). In an actual deployment, customers may be connected to u-PEs (i.e., user-facing Provider Edges) in an aggregation network. The aggregation network may then interface to the n-PEs depicted in this figure. This figure is merely an example and should not be construed as limiting.

In some embodiments, when transporting the traffic belonging to a customer over a PBT trunk, that customer traffic may be assigned a Service Instance Identifier (I-SID) (107) value to identify the customer. The I-SID is a field of the Ethernet frame as defined in IEEE 802.1ah. Using the I-SID value as customer traffic identification, traffic from more than one customer may be transported over a same PBT trunk. The customer traffic identified by a given I-SID value may also be called a Service Instance and the VSIs belonging to a same L2VPN are then interconnected by a full mesh of Service Instances, which are transported over PBT trunks interconnecting the service provider sites. This is exemplified in FIG. 1 for the traffic between service provider sites 1 and 3, where a single PBT trunk is used to carry the Service Instances of customers A and B between these two sites. This is also the case for the traffic between service provider sites 2 and 3. However, between service provider sites 1 and 2 the service provider chose to use separate PBT trunks to carry the traffic of customers A and B. Between service provider sites 1 and 2, the traffic from customer A (i.e., the customer A's Service Instance) is transported using PBT trunk 108, while the traffic from customer B (i.e., the customer B's Service Instance) is transported using PBT trunk 109. The choice of how many customers or types of customers will share a same PBT trunk and how many PBT trunks will be used between service provider sites to create L2VPN services is generally decided by the service provider. The service provider may take various factors into consideration when making this determination including, for example, available network resources, available equipment and their capabilities, customer service requirements, service level agreements, and service provider business models. The service provider will also generally determine the I-SID values assigned to customer traffic. For example, the service provider may assign a same I-SID value for the traffic of a given customer over the whole L2VPN service or it may assign, for a same customer, a different I-SID value for each PBT trunk used by the customer. In some embodiments, it is not necessarily the case that an I-SID value is used to identify the traffic of a customer. For example, the traffic of a customer (or customer Service Instance) may be identified by a VLAN ID or the combination of a multitude of stacked VLAN IDs. Again, this figure is merely an example and should not be construed as limiting.

Figure 2:
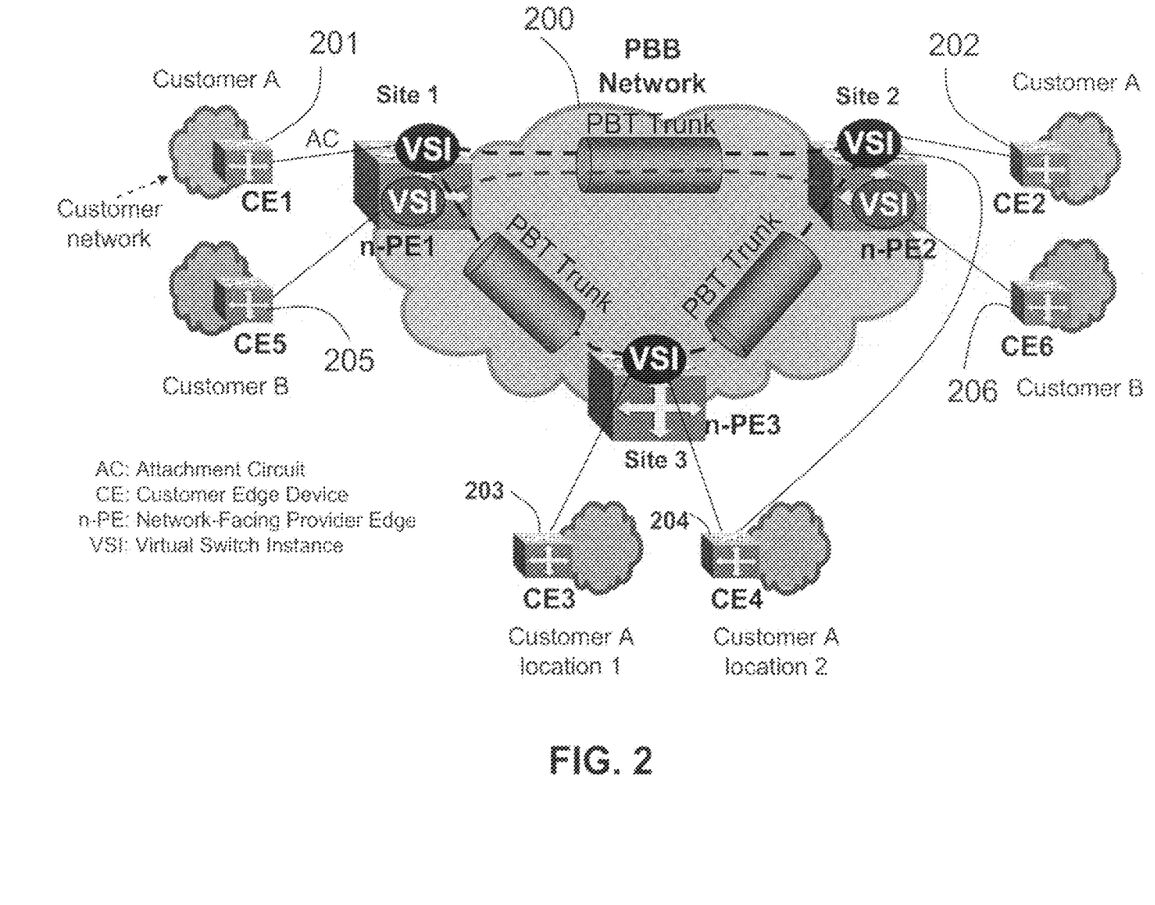
FIG. 2 is a diagram illustrating an embodiment of how L2VPNs do not need to reach all sites and customers may have multiple attachments to the same site.

FIG. 2 is a diagram illustrating an embodiment of how L2VPNs do not need to reach all sites and customers may have multiple attachments to the same site. In general, FIG. 2 shows an example where customer B is not present in site 3. Thus, the L2VPN of customer B does not need to reach site 3 and there is no VSI for customer B in site 3. In the example shown, customer A has two attachments to the L2VPN in site 3 (i.e., customer A has two separate locations near site 3). There are two L2VPNs over PBB network 200, where the L2VPN for customer A spans three service provider sites, while the L2VPN for customer B spans two service provider sites. In this particular configuration, one customer has locations CE1-CE4 (201-204) and the other customer has locations CE5 (205) and CE6 (206). Note that the VSIs for a given L2VPN need only be created on those service provider sites spanned by the L2VPN. This example also shows that a same customer may have more than one customer location (203, 204) attached to the same service provider site. This example also shows that a customer location (204) may be connected to two or more service provider sites (sites 2 and 3) to provide for redundant access to the L2VPN service (to circumvent link or network node failures). A same customer may also subscribe to one or more separate L2VPNs with the same service provider (which is not shown in the figure). In this case, a customer location may be connected to one or more distinct L2VPNs on a same or separate service provider sites. This figure is merely an example and should not be construed as limiting.

Since PBT is inherently a point-to-point technology, it would be desirable to have convenient tools and/or interfaces to provision routes and/or devices rather than having to manually do this in order to achieve the desired multipoint-to-multipoint L2VPN service. In some embodiments, an external control plane is used. Some examples are described in further detail below. In various embodiments, PBT trunks can be setup using any carrier/service provider PBT control plane, such as GMPLS, a carrier/service provider Operational Support System (OSS), or some other external control plane.

In some embodiments, each PE device maintains a MAC address table associating remote destination MAC addresses with PBT trunks and local destination MAC addresses with local customer facing ports. Maintenance of such a table may follow standard IEEE 802.1 MAC address learning principles.

A VSI is an IETF term for a bridge used to construct a VPLS service over an MPLS network. As defined in IETF RFC 4762 and IETF RFC 4761, a VSI provides standard MAC address learning, filtering, and forwarding actions, as defined in IEEE 802.1D and IEEE 802.1Q standards, which define how learning bridges work. A VSI is a learning bridge and can be used to bridge Ethernet traffic from any source. Thus, Ethernet traffic being carried by a PBT (PBB-TE) trunk can be forwarded by a VSI.

Up till now, creating a L2VPN over a Layer 2 network, e.g., IEEE 802.1ad or IEEE 802.1ah network, has been a problem without a good solution. Prior solutions have been to create L2VPNs by isolating the traffic of different customers using Service VLANs (S-VLANs) in IEEE 802.1ad (also called Q-in-Q) networks and Service Instances Identifiers (I-SID) in Provider Backbone Bridging (PBB) networks, i.e., IEEE 802.1ah networks. However, both 802.ad and 802.1ah require the use of a Spanning Tree Protocol (STP) to resolve loops in the physical topology, and service providers often dislike STP since it results in a network with unpredictable behavior. Service providers may also dislike STP because it may take seconds to restore traffic forwarding after link or node failures. In addition, service providers would often rather use a service with the orderly attributes of PBT, which does not rely on STP. However, PBT trunks by themselves only provide point-to-point services, i.e., PBT by itself does not support L2VPNs, which are multipoint-to-multipoint in nature. Therefore, a solution has been needed for quite some time to provide a L2VPN over an Ethernet network, i.e., a Layer 2 network, but with the same orderly attributes as PBT. By using PBT trunks to interconnect Provider Edges (PEs) over a PBB network, the proposed solution provides a L2VPN service that does not rely on STP and retains the orderly attributes of PBT.

Another prior solution called Virtual Private LAN Services (VPLS) allows for the creation of L2VPNs over MPLS/IP networks. However, VPLS does not work directly over PBB networks or an Ethernet network, since it uses Pseudowires for frame transport among the PEs participating in a L2VPN, i.e., VPLS requires an underlying MPLS network, which some service providers dislike due to its increased operational cost and complexity.

Figure 3:
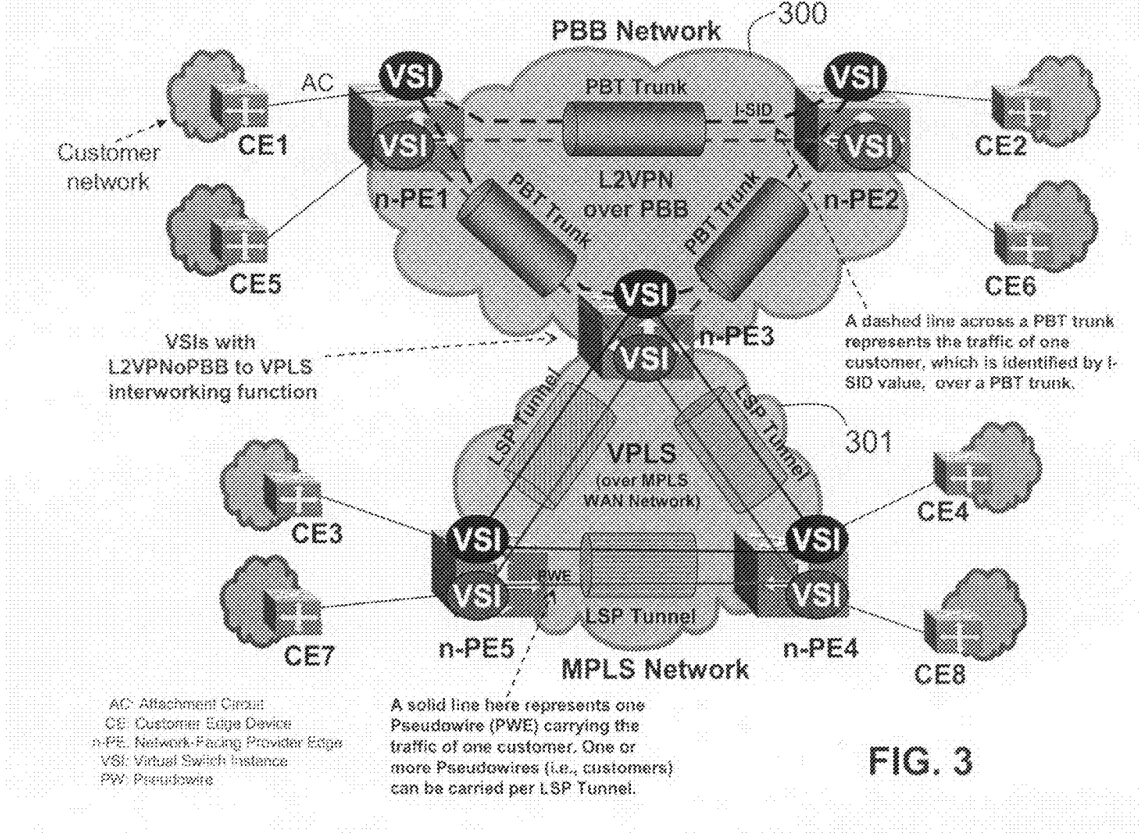
FIG. 3 is a diagram illustrating an embodiment of a L2VPN over PBB interoperating with VPLS.

FIG. 3 is a diagram illustrating an embodiment of a L2VPN over PBB interoperating with VPLS. In the example shown, at the border between PBB network 300 and MPLS WAN network 301, the VSIs of the respective L2VPNs in this example connect to both customer Service Instances over PBT trunks and Pseudowires over LSP Tunnels. That is, a VSI for a given L2VPN is connected to customer Service Instances over PBT trunks on the PBB network side and to Pseudowires over Label-Switched Path (LSP) Tunnels on the MPLS side. In effect, VPLS is implemented on the MPLS network, while L2VPN over PBB (using PBT trunks) is implemented on the PBB network in this embodiment. With this embodiment, a seamless end-to-end L2VPN service is provided to customers, where the end-to-end L2VPN has a L2VPN over PBB part and a VPLS part. Note that in this embodiment the MAC table of the interworking VSI has remote destination MAC address associations with customer Service Instances over PBT trunks and with Pseudowires over LSP Tunnels. Maintenance of the MAC table in the interworking VSI follows standard IEEE 802.1 MAC address learning principles in this example.

The architecture in FIG. 3 can be thought of as a type of hierarchical L2VPN service where a L2VPN over PBB (L2VPNoPBB) is used at the metro network, while VPLS is used at the MPLS WAN (core) network. This architecture decouples the full mesh of Pseudowires from the full mesh of customer Service Instances (which are transported by PBT trunks), allowing for increased scalability of the overall end-to-end L2VPN service.

In some embodiments, products that are commercially available from Hammerhead Systems of Mountain View, Calif., are used to implement the techniques disclosed herein. In one example, a L2VPN service over PBB is required by a customer that deploys PBB in the metro core instead of MPLS/IP. In this scenario, the HSX 6000, available from Hammerhead Systems, can be deployed in the aggregation network to take customer traffic into L2VPNs over the PBB metro core network. As the service provider may deploy an MPLS/IP WAN network, the HSX 6000 can also be deployed with an interworking function between L2VPN over PBB (L2VPNoPBB) and VPLS. In this example configuration, the use of the HSX 6000 is extended to many points in the architecture of a L2VPN (see e.g., FIG. 3) and/or also allows a L2VPN to seamlessly and efficiently span both a PBB network and an MPLS/IP network.

As mentioned with respect to FIG. 1, in some other embodiments, customers are connected to u-PEs (user-facing PEs) in an aggregation network, which in turn interfaces to the n-PEs depicted in this figure. This figure and other figures are exemplary and should not be construed as limiting.

Figure 4:
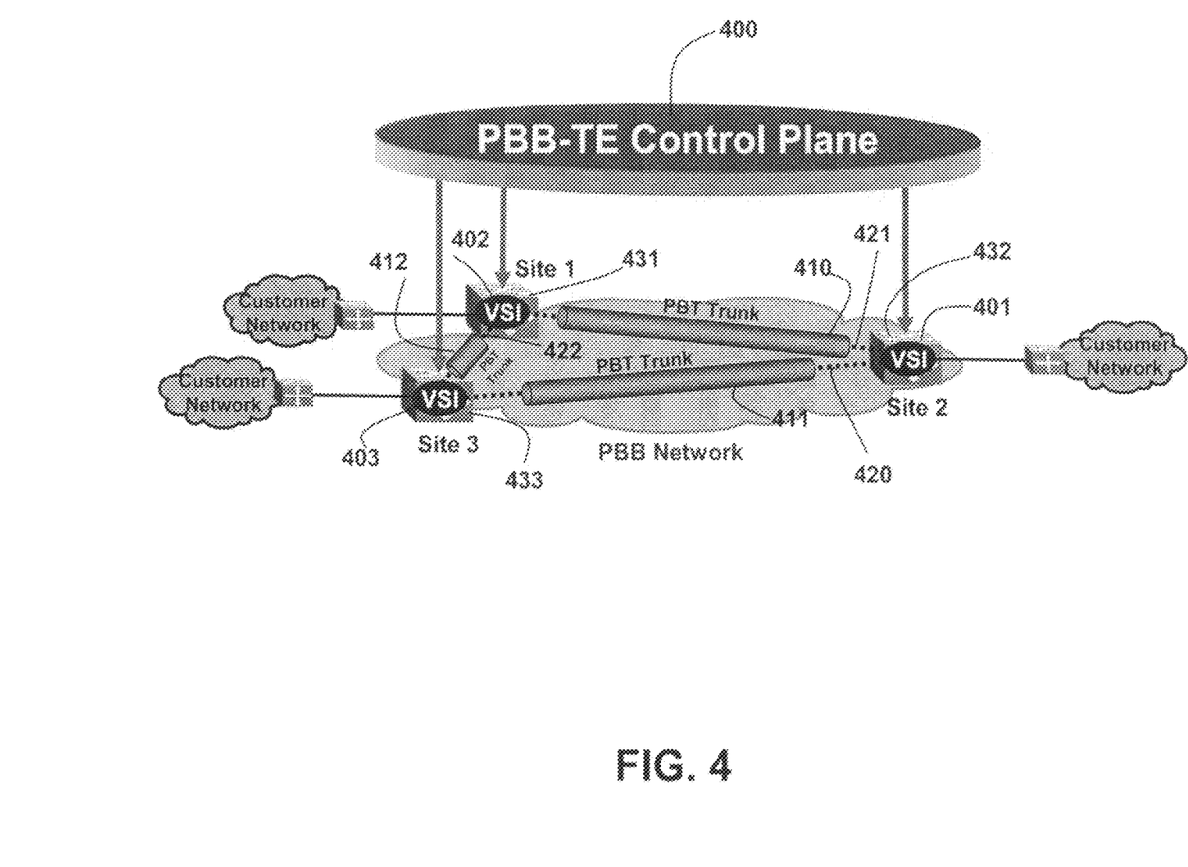
FIG. 4 is a diagram illustrating an embodiment of an external control plane.

FIG. 4 is a diagram illustrating an embodiment of an external control plane. In the example shown, external control plane 400 is used to provision the VSIs and the interconnections of VSIs with a full mesh of customer Service Instances (which are transported over PBT trunks), which are necessary to support multipoint-to-multipoint service. External control plane 400 allows service providers to automate the provisioning of L2VPNs over PBB, which would otherwise have to be manually and/or locally provisioned on each device. In one embodiment, external control plane 400 is provided by Soapstone Networks of Billerica, Mass.

In one embodiment, for the L2VPN shown in FIG. 4, the control plane 400 will provision PBT trunks 410, 411, and 412 to interconnect sites 1, 2, and 3, VSIs 401, 402, and 403, and the full mesh of Services Instances 420, 421, and 422. The control plane 400 will interface with nodes 431, 432, and 433 using, for example, CLI (Command Line Interface) or SNMP (Simple Network Management Protocol) to provision those nodes with the necessary parameters to create those PBT trunks, VSIs, and Service Instances.

There are a number of advantages to using an external control plane (e.g. Soapstone) compared with an in-band-distributed control plane (e.g. GMPLS) for provisioning PBT/PBB-TE trunks. An in-band distributed control plane means that routing and switching products are required to include processing engines powerful enough to support a control plane that can handle the load and that can scale with the service. This is a similar problem faced by routers which usually have problems supporting more than a few thousand Pseudowires. As a result, routers and switches usually end up underpowered to handle realistic control plane loads. An external control plane (also called a centralized control plane), eliminates this hardware limitation, since the choice of a processing engine for the control plane is not tied to the development cycle of the router or switch. A separate control plane based on software running on general purpose computing platforms can track Moore's Law improvements in computing capabilities without being limited by past router hardware design points. Scaling is then accomplished by adding additional processing and memory, if and when needed.

An external control plane also eliminates vendor limitations on innovations. With an external control plane, many features can be implemented in the control plane software itself and put into service independent of the forwarding plane hardware. Moreover, this mediates differences in implementation between vendors and enables a seamless service that otherwise would not be possible.

A centralized control plane also enhances robustness, since it isolates the control plane from data plane anomalies and attacks.

Figure 5:
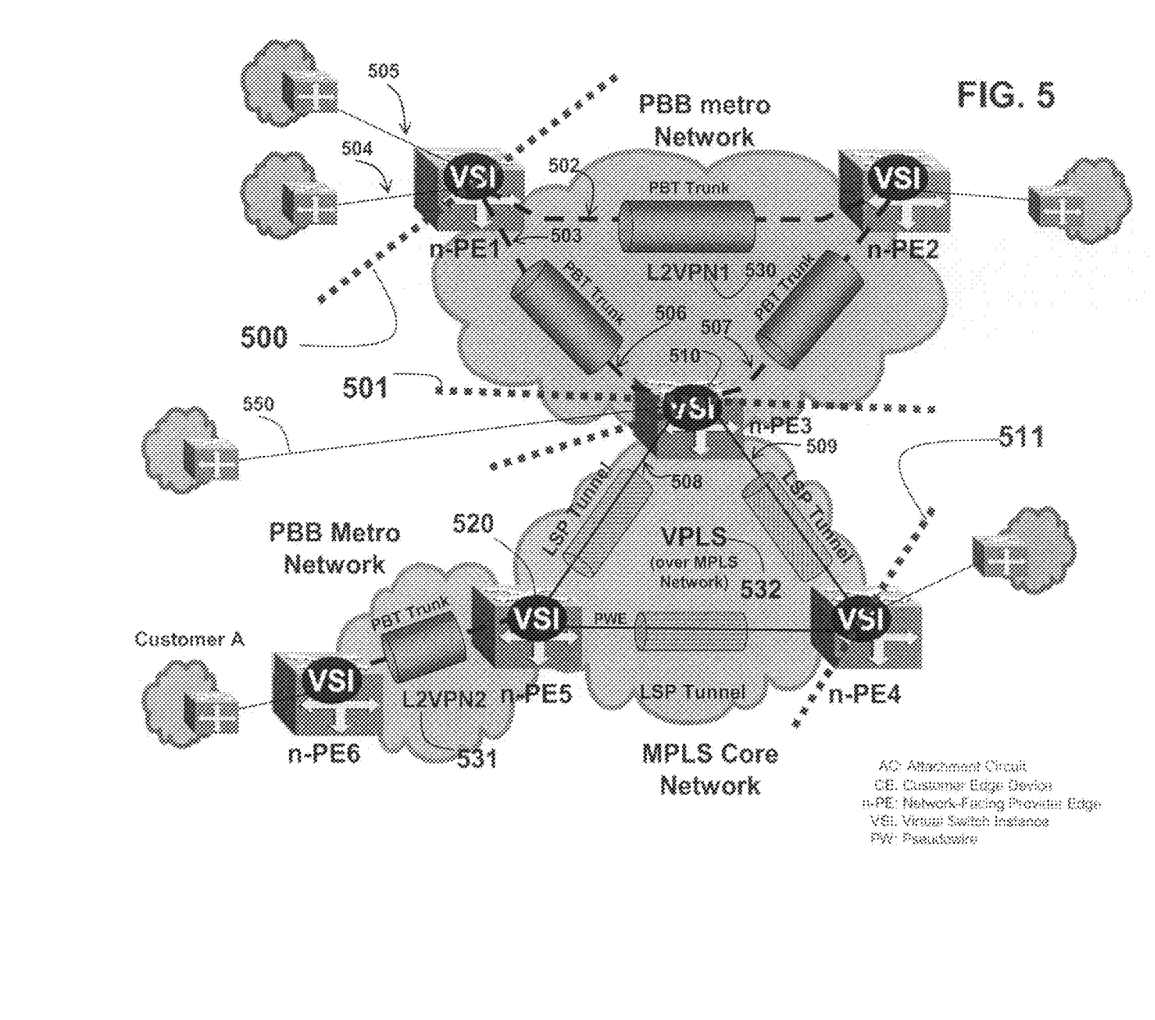
FIG. 5 is a diagram illustrating an embodiment of frame forwarding rules collectively called split horizon.

FIG. 5 is a diagram illustrating an embodiment of frame forwarding rules collectively called split horizon. A form of split horizon is also used with VPLS, as described in RFC 4762. In some embodiments, split horizon is used to prevent or avoid loops so that frames do not unnecessarily flood the L2VPN. A split horizon rule constrains the normal forwarding feature of a VSI (which is a learning bridge), which would normally allow a frame received on a VSI connection to be forwarded to any one of the other VSI connections. New split horizon rules are defined here for use with L2VPN over PBB networks, as is described next. FIG. 5 illustrates an end-to-end L2VPN for a customer using an MPLS Core network and two PBB metro networks. The end-to-end L2VPN is constructed by interconnecting L2VPN1 530 and L2VPN2 531, which are both instances of L2VPN over PBB, and VPLS 532 using the common VSIs 510 and 520 at the border of the PBB metro networks and the MPLS core network. To avoid forwarding loops, the split horizon rule 500 is first defined. Split horizon rule 500 is conceptual in nature and has two sides, each corresponding to a different type of network. On the lower right hand side of split horizon rule 500 are Service Instance connections 502 and 503. On the other side (i.e., upper left hand side) of split horizon rule 500 are the customer interface connections 504 and 505. A split horizon rule such as 500 applies to VSIs connected to Service Instances over PBT trunks and customer bound interfaces. Split horizon rule 500 states that: (1) whenever a frame is received from a Service Instance (which is transported over a PBT trunk) it can only be forwarded to customer bound interfaces; and (2) whenever a frame is received from a customer bound interface, it can be forwarded to any other VSI connection, i.e., the VSI uses its normal forwarding behavior. For example, a frame received from Service Instance 502 can only be forwarded to interface connections 504 and 505 (i.e., the frame can be forwarded to either one of these interface connection or both) and will not be forwarded to another Service Instance, such as Service Instance connection 503. In addition, a frame received from customer interface 504 can be forwarded as usual by the VSI forwarding process, i.e., it can be forwarded to interface connection 505 and Service Instances 502 and 503. Similarly, the split horizon rule 501 will avoid forwarding loops. Split horizon rule 501 is also conceptual in nature and has three sides (i.e., this is a three-dimensional split horizon rule), each corresponding to a different type of network. On the upper hand side of split horizon rule 501 are Service Instance connections 506 and 507. On the lower hand of split horizon rule 501 are Pseudowire connections 508 and 509. On the left hand side is customer interface connection 550. Split horizon rule 501 applies to the VSIs that provide interworking between the PBB and MPLS networks, such as VSI 510. Split horizon rule 501 states that: (1) whenever a frame is received from a Service Instance (which is transported over a PBT trunk), it can only be forwarded to Pseudowires over the MPLS network and customer interface connections; (2) whenever a frame is received from a Pseudowire (which is transported over an MPLS network), it can only be forwarded to Service Instances (which are transported over PBT trunks) and customer interface connections; and (3) whenever a frame is received from a customer bound interface, it can be forwarded to any other VSI connection, i.e., the VSI uses its normal forwarding behavior. For example, a frame received from Service Instance 506 can only be forwarded to Pseudowires 508 and 509 and customer interface 550 and will not be forwarded to another Service Instance, such as Service Instance connection 507. Conversely, a frame received from Pseudowire 508 can only be forwarded to Service Instances 506 and 507 and customer interface connection 550 and will not be forwarded to another Pseudowire, such as Pseudowire connection 509. Note that customer interface connections like 550 are optional. If no customer interface connection such as 550 is present, the split horizon rule 501 can be simplified. In this case, it would state that: (1) whenever a frame is received from a Service Instance (which is transported over a PBT trunk), it can only be forwarded to Pseudowires over the MPLS network; and (2) whenever a frame is received from a Pseudowire (which is transported over an MPLS network), it can only be forwarded to Service Instances (which are transported over PBT trunks). Note that split horizon rules 500 and 501 are new types of split horizon rules defined here to avoid loops due to the L2VPNs over PBB. The split horizon rule 511 exemplified here is the common well-known split horizon rule defined in RFC 4762 to avoid loops in the VPLS network. Split horizon rule 511 is explained here to highlight how it differs from split horizon rules 500 and 501. Split horizon rule 511 states that: (1) whenever a frame is received from a Pseudowire, it can only be forwarded to customer bound interfaces; and (2) whenever a frame is received from a customer interface, it can be forwarded to any one of the other VSI connections. For example, a frame received from a Pseudowire will never be forwarded to another Pseudowire. In one embodiment, one or multiple PBB metro networks can be connected to a core MPLS network to provide an end-to-end L2VPN for a customer. The fact that FIG. 5 shows two PBB metro networks is exemplary and should not be construed as limiting.

Whenever it is said that a frame can be sent (or can only be sent) to A, B and C, where an element in this list is a Pseudowire, a service instance connection, or a customer interface, it is meant the frame can be sent to any subset of the elements in this set. That is the frame can be sent to either A, B, C, A and B, A and C, B and C, or A, B, and C. In other words, the solution supports unicast forwarding (i.e., sending to either A, B, or C), broadcast forwarding (i.e., sending to A, B, and C), and multicast forwarding (i.e., sending to any subset of the list).

Figure 6:
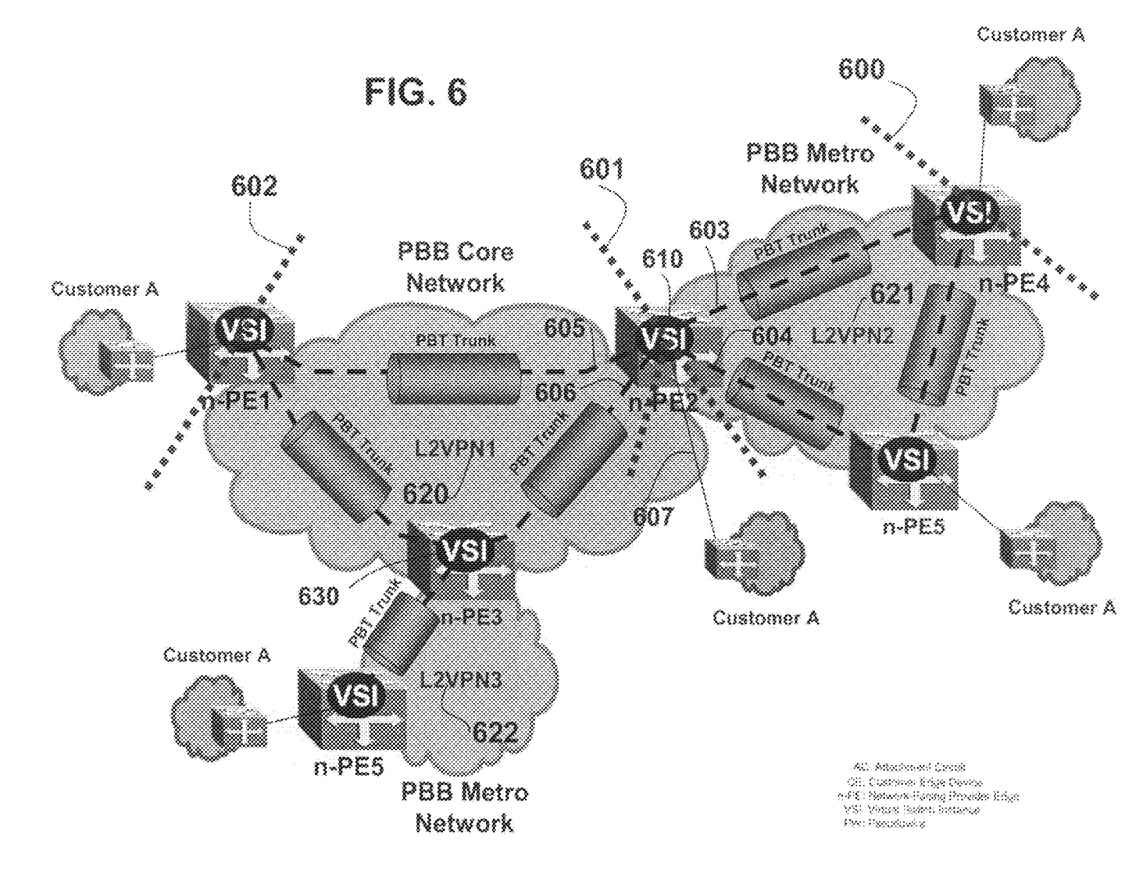
FIG. 6 is a diagram illustrating an embodiment of an end-to-end L2VPN over PBB for a customer using a PBB Core network and two PBB metro networks.

FIG. 6 is a diagram illustrating an embodiment of an end-to-end L2VPN over PBB for a customer using a PBB Core network and two PBB metro networks. The end-to-end L2VPN is constructed by interconnecting L2VPN1 620, L2VPN2 621, and L2VPN3 622 using the common VSIs 610 and 630 at the border of the PBB core and metro networks. In some embodiments, new split horizon rules are used to prevent or avoid loops so that frames do not unnecessarily flood the L2VPN. To avoid forwarding loops, split horizon rules 600 and 602 are first determined. These split horizon rules are similar in objective and operation to split horizon rule 500 in FIG. 5. To make it very clear, split horizon rules 600 and 602 state that: (1) whenever a frame is received from a Service Instance (which is transported over a PBT trunk) it can only be forwarded to customer bound interfaces; and (2) whenever a frame is received from a customer bound interface, it can be forwarded to any other VSI connection, i.e., the VSI uses its normal forwarding behavior. Note that split horizon rule 602 is described here to demonstrate that the PBB core network can also have customer attachments to the L2VPN. Split horizon rule 600 demonstrates a more common use case, i.e., customers attached to the L2VPN at the PBB metro network. The new split horizon rule 601 is determined to avoid loops when interconnecting PBB metro and PBB core networks. Split horizon rule 601 is conceptual in nature and has three sides (i.e., this is a three-dimensional split horizon rule), each corresponding to a different type of network. On the right hand side of split horizon 601 are Service Instance connections 603 and 604 over the PBB metro network. On the left hand side of split horizon 601 are Service Instance connections 605 and 606 over the PBB core network. On the lower hand side of split horizon 601 is customer interface connection 607. A split horizon rule such as 601 applies to VSIs connected to Service Instances over PBT trunks between PBB Core and PBB metro networks. Split horizon rule 601 states that: (1) whenever a frame is received from a Service Instance over a PBT trunk from the PBB metro network it can only be forwarded to Service Instances over PBT trunks over the PBB core network and customer bound interfaces; (2) whenever a frame is received from a Service Instance over a PBT trunk from the PBB core network it can only be forwarded to Service Instances over PBT trunks over the PBB metro network and customer bound interfaces; and (3) whenever a frame is received from a customer bound interface, it can be forwarded to any other VSI connection, i.e., the VSI uses its normal forwarding behavior. For example, a frame received from Service Instance 603 can only be forwarded to customer interface connection 607 and Service Instances 605 and 606 and will not be forwarded to another Service Instance on the same PBB network, such as Service Instance connection 604. A frame received from customer interface 607 can be forwarded as usual by the VSI forwarding process, i.e., it can be forwarded to Service Instances 603 to 606. A frame received from Service Instance 605 can only be forwarded to customer interface connection 607 and Service Instances 603 and 604 and will not be forwarded to another Service Instance on the same PBB network, such as Service Instance connection 606. Note that customer interface connections such as 607 at the border of the metro and core PBB networks are optional. If no customer interface connection such as 607 is present, split horizon rule 601 can be simplified. In this case, it would state that: (1) whenever a frame is received from a Service Instance over a PBT trunk from the PBB metro network it can only be forwarded to Service Instances over PBT trunks over the PBB core network; and (2) whenever a frame is received from a Service Instance over a PBT trunk from the PBB core network it can only be forwarded to Service Instances over PBT trunks over the PBB metro network. In one embodiment, one or multiple PBB metro networks can be connected to a PBB core network to provide an end-to-end L2VPN for a customer. The fact that FIG. 6 shows two PBB metro networks is exemplary and should not be construed as limiting.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for interconnecting a Layer 2 Virtual Private Network (L2VPN) system, comprising:
    coupling a plurality of sites in a Provider Backbone Bridge (PBB) network using a plurality of provider backbone trunks that includes a Provider Backbone Transport (PBT) trunk or a Provider Backbone Bridge Traffic Engineering (PBB-TE) trunk, such that the L2VPN includes the plurality of sites;
    provisioning one or more Virtual Switch Instances (VSIs) associated with the plurality of sites, the provisioning to be performed using a control plane that is external to the plurality of sites; and
    using a split horizon rule to control distribution of received frames, wherein the split horizon rule is associated with a first VSI coupling the PBB network to a Multi Protocol Label Switching (MPLS) network, the split horizon rule to restrict the normal VSI frame forwarding/distribution of received frames such that:
        (1) in the event a frame is received from a Service Instance over one of the plurality of provider backbone trunks, the received frame is forwarded to Pseudowires over the MPLS network and a set of customer bound interfaces;
        (2) in the event a frame is received from a Pseudowire over the MPLS network, the received frame is forwarded to a set of Service Instances over the plurality of provider backbone trunks and a set of customer bound interfaces; and
        (3) in the event a frame is received from a customer bound interface, the received frame is forwarded as defined by the normal VSI frame forwarding behavior and no forwarding restrictions are imposed on the VSI.

2. The method of claim 1, wherein a first L2VPN is provided for a first customer and a second L2VPN is provided for a second customer.

3. The method of claim 2, wherein the first L2VPN is associated with a first plurality of VSIs and the second L2VPN is associated with a second plurality of VSIs.

4. The method of claim 3, further comprising connecting the first plurality of VSIs associated with the first L2VPN using a plurality of Service Instances transported over the plurality of provider backbone trunks.

5. The method of claim 2, wherein the first customer is associated with a first Service Instance and the second customer is associated with a second Service Instance.

6. The method of claim 4, wherein the first Service Instance is defined by one of the following: an I-SID value, a VLAN ID, a stack of VLAN IDs, an I-SID value and a VLAN ID, or an I-SID value and a stack of VLAN IDs.

7. The method of claim 5, wherein the first Service Instance is unique across a network.

8. The method of claim 2, wherein the first customer is associated with a plurality of Service Instances transported over the plurality of provider backbone trunks.

9. The method of claim 1 further comprising:
    providing a Virtual Private LAN Services (VPLS) on the MPLS network comprising a second plurality of sites; and
    coupling the second plurality of sites using a plurality of Pseudowires, wherein the L2VPN further includes the second plurality of sites.

10. The method of claim 1 further comprising coupling a plurality of L2VPNs over a plurality of PBB metro networks to a Virtual Private LAN Services (VPLS) service over a core MPLS network to build an end-to-end L2VPN service for a customer.

11. The method of claim 1 further comprising coupling a plurality of L2VPNs over a plurality of PBB metro networks to a L2VPN over the PBB network to build an end-to-end L2VPN over PBB for a customer.

12. The method of claim 1 further comprising using the first VSI to couple the L2VPN over the PBB network with a Virtual Private LAN Services (VPLS) service over the MPLS network to build an end-to-end L2VPN service for a customer.

13. The method of claim 1 further comprising using a second VSI to couple the L2VPN over the PBB network with another L2VPN over another PBB network to build an end-to-end L2VPN service for a customer.

14. A system for interconnecting a Layer 2 Virtual Private Network (L2VPN) system, comprising:
    a connector configured to couple a plurality of sites in a Provider Backbone Bridge (PBB) network using a plurality of provider backbone trunks that includes a Provider Backbone Transport (PBT) trunk or a Provider Backbone Bridge Traffic Engineering (PBB-TE) trunk, such that the L2VPN includes the plurality of sites;
    a controller coupled to the connector, wherein the controller is configured to interface with a control plane that is capable of provisioning one or more Virtual Switch Instances (VSIs) associated with the plurality of sites, the control plan to be external to the plurality of sites; and
    a first VSI configured to use a split horizon rule to control distribution of received frames, wherein the first VSI is also configured to couple the PBB network to a Multi Protocol Label Switching (MPLS) network and to use the split horizon rule to restrict the normal VSI frame forwarding/distribution of received frames such that:
        (1) in the event a frame is received from a Service Instance over one of the plurality of provider backbone trunks, the received frame is forwarded to Pseudowires over the MPLS network and a set of customer bound interfaces;
        (2) in the event a frame is received from a Pseudowire over the MPLS network, the received frame is forwarded to a set of Service Instances over the plurality of provider backbone trunks and a set of customer bound interfaces; and
        (3) in the event a frame is received from a customer bound interface, the received frame is forwarded as defined by the normal VSI frame forwarding behavior and no forwarding restrictions are imposed on the VSI.

15. The system of claim 14, wherein a first L2VPN is provided for a first customer and a second L2VPN is provided for a second customer.

16. The system of claim 15, wherein the first L2VPN is associated with a first plurality of VSIs and the second L2VPN is associated with a second plurality of VSIs.

17. The system of claim 16, wherein the connector is further configured to couple the first plurality of VSIs associated with the first L2VPN using a plurality of Service Instances transported over the plurality of provider backbone trunks.

18. The system of claim 15, wherein the first customer is associated with a first Service Instance and the second customer is associated with a second Service Instance.

19. The system of claim 18, wherein the first Service Instance is defined by one of the following: an I-SID value, a VLAN ID, a stack of VLAN IDs, an I-SID value and a VLAN ID, or an I-SID value and a stack of VLAN IDs.

20. The system of claim 18, wherein the first Service Instance is unique across a network.

21. The system of claim 15, wherein the first customer is associated with a plurality of Service Instances transported over the plurality of provider backbone trunks.

22. The system of claim 14, wherein the connector is further configured to couple a plurality of L2VPNs over a plurality of PBB metro networks to a Virtual Private LAN Services (VPLS) service over a core MPLS network to build an end-to-end L2VPN service for a customer.

23. The system of claim 14, wherein the connector is further configured to couple a plurality of L2VPNs over a plurality of PBB metro networks to a L2VPN over the PBB network to build an end-to-end L2VPN over PBB for a customer.

24. The system of claim 14, wherein the connector is further configured to use the first VSI to couple the L2VPN over the PBB network with a Virtual Private LAN Services (VPLS) service over the MPLS network to build an end-to-end L2VPN service for a customer.

25. The system of claim 14 where the connector is further configured to use a common VSI configured to couple the L2VPN over the PBB network with another L2VPN over another PBB network to build an end-to-end L2VPN service for a customer.

26. A computer program product for interconnecting a Layer 2 Virtual Private Network (L2VPN) system, the computer program product being embodied in a non-transitory computer readable storage medium and comprising computer instructions for:
   coupling a plurality of sites in a Provider Backbone Bridge (PBB) network using a plurality of provider backbone trunks that includes a Provider Backbone Transport (PBT) trunk or a Provider Backbone Bridge Traffic Engineering (PBB-TE) trunk, such that the L2VPN includes the plurality of sites;
   provisioning one or more Virtual Switch Instances (VSIs) associated with the plurality of sites, the provisioning to be performed using a control plane that is external to the plurality of sites;
   using a split horizon rule to control distribution of received frames, wherein the split horizon rule is associated with a first VSI coupling the PBB network to a Multi Protocol Label Switching (MPLS) network, the split horizon rule to restrict the normal VSI frame forwarding/distribution of received frames such that:
      (1) in the event a frame is received from a Service Instance over one of the plurality of provider backbone trunks, the received frame is forwarded to Pseudowires over the MPLS network and a set of customer bound interfaces;
      (2) in the event a frame is received from a Pseudowire over the MPLS network, the received frame is forwarded to a set of Service Instances over the plurality of provider backbone trunks and a set of customer bound interfaces; and
      (3) in the event a frame is received from a customer bound interface, the received frame is forwarded as defined by the normal VSI frame forwarding behavior and no forwarding restrictions are imposed on the VSI.

27. The computer program product of claim 26, wherein a first L2VPN is provided for a first customer and a second L2VPN is provided for a second customer.

28. The computer program product of claim 27, wherein the first L2VPN is associated with a first plurality of VSIs and the second L2VPN is associated with a second plurality of VSIs.

29. The computer program product of claim 28, further comprising computer instructions for coupling the first plurality of VSIs associated with the first L2VPN using a plurality of Service Instances transported over the plurality of provider backbone trunks.

30. The computer program product of claim 27, wherein the first customer is associated with a first Service Instance and the second customer is associated with a second Service Instance.

31. The computer program product of claim 30, wherein the first Service Instance is defined by one of the following: an I-SID value, a VLAN ID, a stack of VLAN IDs, an I-SID value and a VLAN ID, or an I-SID value and a stack of VLAN IDs.

32. The computer program product of claim 30, wherein the first Service Instance is unique across a network.

33. The computer program product of claim 27, wherein the first customer is associated with a plurality of Service Instances transported over the plurality of provider backbone trunks.

34. The computer program product of claim 26 further comprising computer instructions for:
   providing a Virtual Private LAN Services (VPLS) on the MPLS network comprising a second plurality of sites; and
   coupling the second plurality of sites using a plurality of Pseudowires, wherein the L2VPN further includes the second plurality of sites.

35. The computer program product of claim 26 further comprising computer instructions for coupling a plurality of L2VPNs over a plurality of PBB metro networks to a Virtual Private LAN Services (VPLS) service over a core MPLS network to build an end-to-end L2VPN service for a customer.

36. The computer program product of claim 26 further comprising computer instructions for coupling a plurality of L2VPNs over a plurality of PBB metro networks to a L2VPN over the PBB network to build an end-to-end L2VPN over PBB for a customer.

37. The computer program product of claim 26 further comprising computer instructions for using the first VSI to couple the L2VPN over the PBB network with a Virtual Private LAN Services (VPLS) service over the MPLS network to build an end-to-end L2VPN service for a customer.

38. The computer program product of claim 26 further comprising computer instructions for using a second VSI to couple the L2VPN over the PBB network with another L2VPN over another PBB network to build an end-to-end L2VPN service for a customer.

39. A method for interconnecting a Layer 2 Virtual Private Network (L2VPN) system, comprising:
 coupling a plurality of sites in a Provider Backbone Bridge (PBB) network using a plurality of provider backbone trunks that includes a Provider Backbone Transport (PBT) trunk or a Provider Backbone Bridge Traffic Engineering (PBB-TE) trunk, such that the L2VPN includes the plurality of sites;
 provisioning one or more Virtual Switch Instances (VSIs) associated with the plurality of sites, the provisioning to be performed using a control plane that is external to the plurality of sites; and
 using a split horizon rule to control distribution of received frames, wherein the split horizon rule is associated with a first VSI coupling a PBB core network having a first set of Service Instances over a first plurality of provider backbone trunks to a PBB metro network having a second set of Service Instances over a second plurality of provider backbone trunks, the split horizon rule to restrict the normal VSI frame forwarding/distribution of received frames such that:
 (1) in the event a frame is received from one of a second set of Service Instances over the second plurality of provider backbone trunks of the PBB metro network, the received frame can only be forwarded to the first set of Service Instances over the first plurality of provider backbone trunks of the PBB core network and a set of customer bound interfaces;
 (2) in the event a frame is received from one of a first set of Service Instances over the first plurality of provider backbone trunks of the PBB core network, the received frame can only be forwarded to the second set of Service Instances over the second plurality of provider backbone trunks of the PBB metro network and a set of customer bound interfaces; and
 (3) in the event a frame is received from one of a set of customer bound interfaces, the received frame is forwarded as defined by the normal VSI frame forwarding behavior and no forwarding restrictions are imposed on the VSI.

40. The method of claim 39, wherein a first L2VPN is provided for a first customer and a second L2VPN is provided for a second customer.

41. The method of claim 40, wherein the first L2VPN is associated with a first plurality of VSIs and the second L2VPN is associated with a second plurality of VSIs.

42. The method of claim 41, further comprising coupling the first plurality of VSIs associated with the first L2VPN using a plurality of Service Instances transported over the plurality of provider backbone trunks.

43. The method of claim 40, wherein the first customer is associated with a first Service Instance and the second customer is associated with a second Service Instance.

44. The method of claim 43, wherein the first Service Instance is defined by one of the following: an I-SID value, a VLAN ID, a stack of VLAN IDs, an I-SID value and a VLAN ID, or an I-SID value and a stack of VLAN IDs.

45. The method of claim 43, wherein the first Service Instance is unique across a network.

46. The method of claim 40, wherein the first customer is associated with a plurality of Service Instances transported over the plurality of provider backbone trunks.

47. The method of claim 39 further comprising:
 providing a Virtual Private LAN Services (VPLS) on a Multi Protocol Label Switching (MPLS) network comprising a second plurality of sites; and
 coupling the second plurality of sites using a plurality of Pseudowires, wherein the L2VPN further includes the second plurality of sites.

48. The method of claim 39 further comprising coupling a plurality of L2VPNs over a plurality of PBB metro networks to a Virtual Private LAN Services (VPLS) service over a core MPLS network to build an end-to-end L2VPN service for a customer.

49. The method of claim 39 further comprising coupling a plurality of L2VPNs over a plurality of PBB metro networks to a L2VPN over the PBB network to build an end-to-end L2VPN over PBB for a customer.

50. The method of claim 39 further comprising using the first VSI to couple the L2VPN over the PBB network with a Virtual Private LAN Services (VPLS) service over an Multi Protocol Label Switching (MPLS) network to build an end-to-end L2VPN service for a customer.

51. The method of claim 39 further comprising using a second VSI to couple the L2VPN over the PBB metro network with another L2VPN over another PBB core network to build an end-to-end L2VPN service for a customer.

* * * * *